(12) United States Patent
Ogle et al.

(10) Patent No.: US 8,536,875 B2
(45) Date of Patent: Sep. 17, 2013

(54) TESTING FLEX AND APFA ASSEMBLIES FOR HARD DISK DRIVES

(75) Inventors: Wade A. Ogle, San Jose, CA (US); Henry Patland, Los Gatos, CA (US); Walter G. Bankshak, Jr., Morgan Hill, CA (US)

(73) Assignee: Infinitum Solutions, Inc., Santa Clara, CA (US)

( * ) Notice: Subject to any disclaimer, the term of this patent is extended or adjusted under 35 U.S.C. 154(b) by 414 days.

(21) Appl. No.: 12/902,445

(22) Filed: Oct. 12, 2010

(65) Prior Publication Data

US 2011/0095766 A1 Apr. 28, 2011

Related U.S. Application Data

(60) Provisional application No. 61/255,803, filed on Oct. 28, 2009.

(51) Int. Cl.
*G01R 31/02* (2006.01)

(52) U.S. Cl.
USPC ............... 324/537; 324/754.01; 324/763.01; 324/538

(58) Field of Classification Search
USPC ............ 324/537, 750.16, 750.25, 754.01, 324/754.03, 754.08, 754.12, 754.13, 754.14, 324/756.01, 756.04, 756.05, 763.01, 538; 360/31, 55, 245.8, 245.9
See application file for complete search history.

(56) References Cited

U.S. PATENT DOCUMENTS

| | | | |
|---|---|---|---|
| 6,441,621 B2 * | 8/2002 | Nagata | 324/537 |
| 6,690,546 B2 * | 2/2004 | Gouo | 360/244.1 |
| 6,956,722 B2 * | 10/2005 | Wada et al. | 360/245.8 |
| 7,071,716 B2 * | 7/2006 | Swart | 324/756.01 |
| 8,085,510 B2 * | 12/2011 | Iben | 360/323 |
| 2002/0162061 A1 * | 10/2002 | Haroosh | 714/720 |
| 2004/0189281 A1 * | 9/2004 | Le et al. | 324/158.1 |
| 2004/0201388 A1 * | 10/2004 | Barr | 324/754 |
| 2005/0179454 A1 * | 8/2005 | LaMeres et al. | 324/754 |
| 2007/0007984 A1 * | 1/2007 | Kojima et al. | 324/765 |

FOREIGN PATENT DOCUMENTS

WO   WO 2005089032 A1 *   9/2005

* cited by examiner

*Primary Examiner* — Huy Q Phan
*Assistant Examiner* — James Split
(74) *Attorney, Agent, or Firm* — Silicon Valley Patent Group LLP (57) ABSTRACT

A tester for a testing a Hard Disk Drive (HDD) flex circuit prior to electrical installation of a Head Gimbal Assembly (HGA) includes a shorting block that makes electrical contact to the bondpads on the sample. The shorting block includes one or more electrical contacts that are electrically grounded and have a size and/or configuration to contact the bondpads as well as the surface of the sample around the bondpads to accommodate positioning tolerances of the sample under test, without need for optics, precise probes, or precision stages. The electrical contacts of the shorting block may be, e.g., a matrix of pogopins or a flexible electrically-conductive material. During testing, the bondpads are shorted together and to ground with the shorting block while it is determined whether Short failures are properly detected. While the shorting block is not engaged with the bondpads, it is determined whether open failures are properly detected.

19 Claims, 7 Drawing Sheets

TESTING FLEX AND APFA ASSEMBLIES FOR HARD DISK DRIVES

CROSS-REFERENCE TO PENDING PROVISIONAL APPLICATION

This application claims the benefit of U.S. Provisional Application No. 61/255,803, filed Oct. 28, 2009 and entitled "Testing Flex and APFA Assemblies for Hard Disk Drives", which is incorporated herein by reference.

BACKGROUND

As technology advances, it becomes increasingly difficult and costly to test or verify the operation of electronic devices. One example of this is found in storage systems within the Hard Disk Drive (HDD) industry. There is pressure to reduce cost in the manufacturing of HDD subcomponents while not increasing the cost of scrap that occurs if failed subcomponents are not screened early enough and are not detected until later in the manufacturing process.

It is therefore desirable to test HDD subcomponents, such as the Flip Chip on Flex (FCOF) subassemblies used on the HDD Head Stack Assembly (HSA) early in the manufacturing process to increase yield and reduce cost. The FCOF is an electrical flex circuit assembly including an HDD preamplifier chip, such as products supplied by, e.g., Texas Instruments, a connector, and various other electronic components all electrically bonded to the flex circuit. This flex circuit will also have several bondpads available for electrical connection to one or more magnetic recording heads, referred to as Head Gimbal Assemblies (HGAs). For each HGA that will be electrically bonded to the flex circuit, the flex circuit will have a corresponding set of individual bondpads matching both the quantity and geometry of the bondpads of the HGA. Today's HGAs typically have 8 bondpads, for example, thus the flex circuits will contain matching sets of eight bondpads (i.e. bondpad sets) for each HGA to be bonded. As an example, considering an HSA designed for 8 HGAs, where each of these HGAs requires 8 bondpads, there will be 8 bondpads/HGA×8 bondpad sets, i.e., 64 individual bondpads per FCOF. For purposes herein, individual bondpads will be referred to as bondpads, and a bondpad set will be a set of these individual bondpads (for example, 8 bondpads) corresponding to the quantity and geometry used to match to the mating HGA.

During the HDD manufacturing process the FCOF will be installed onto an HSA Arm and this new assembly of FCOF plus HSA Arm is generally referred to as an Actuator Pivot Flex Assembly (APFA). Then, the one or more HGAs will be mounted to this APFA, through the combination of being mechanically swaged to the HSA arm and electrically bonded to the FCOF by bonding the HGA contact pads with the corresponding bondpad set on the FCOF to provide electrical connection. Then this HSA assembly will be installed into the hard disk drive for actual operation. Because the HGAs add significant cost to the HSA assembly, if the FCOF has any sort of failure, such as any opens or shorts in the traces on the flex circuit, any failures of the preamplifier chip, or any improper electrical bonding of any one of the bonded electrical components, it will be very costly to find the failure in the FCOF at later stages in the manufacturing process.

Figure 5:
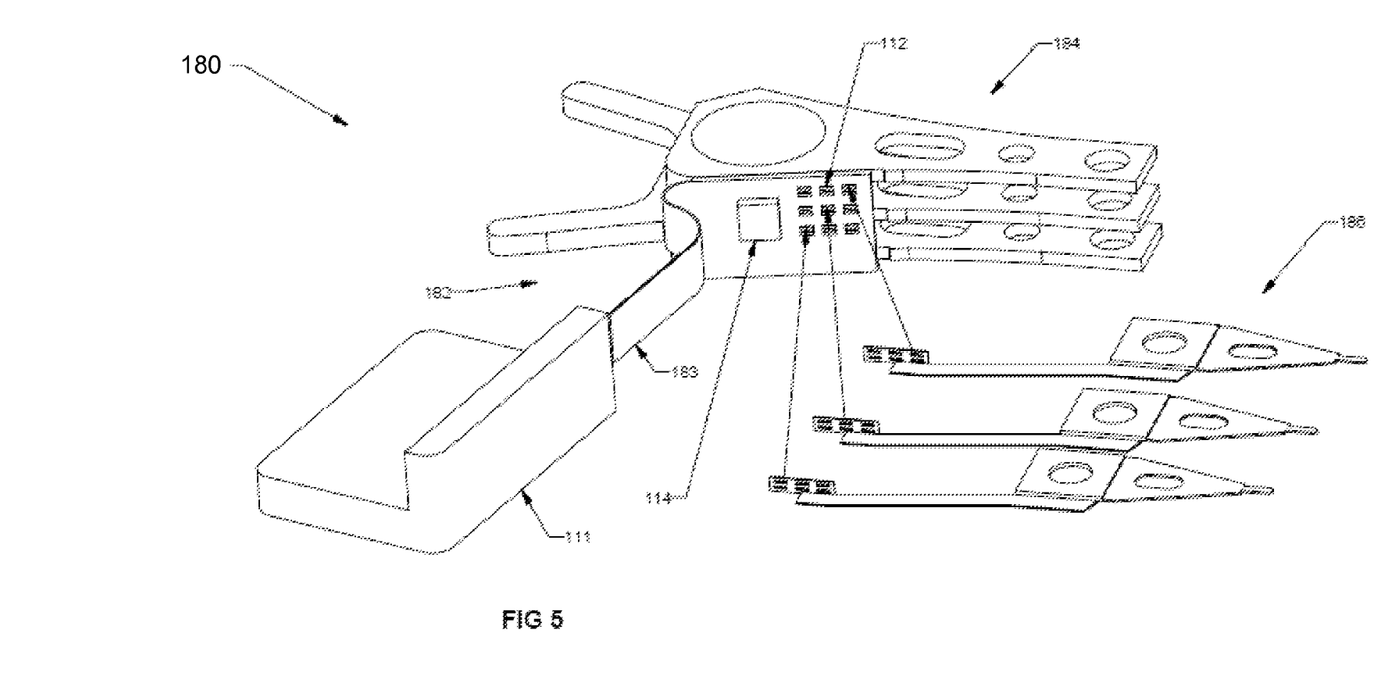
FIG. 5 shows a typical APFA Assembly and three HGAs just prior to bonding, as known in the art today.

For illustration, reference is made to FIG. 5, which shows an example of an APFA 180, with an FCOF 182 and an HSA Arm 184, just prior to bonding 3 HGAs 186. In this example, each HGA 180 has 6 bondpads, so the illustrated FCOF 182 is shown with 18 bondpads 112 in total, in three sets of 6. Also illustrated on the FCOF 182 are a preamplifier chip 114 and a connector 111 bonded to a flex circuit 183.

The 6 or 8 HGA pad connections of each bondpad set provide unique functions to the magnetic recording head. One pair of connections will be the +/− connections for the magnetoresistive Reader element of the head. Another pair will be the +/− connections for the Write element of the head. Other individual or pairs of connections per each HGA will have other purposes, such as for flying height control, microactuation, or other features. As the hard disk drives become more complex the HGAs are designed with additional devices to increase performance, and so the quantity of individual bondpad connections increases because each of these new devices must be electrically coupled to and controlled by the preamplifier chip or primary circuit board on the hard disk drive. Thus, there is a tendency for the quantity of bondpads in each bondpad set to increase. Further, as the quantity of bondpads increase there is a tendency to make each individual bondpad smaller, for size reduction.

Current testers for FCOFs have test circuitry that can exercise the FCOF plus a means of electrically coupling this test circuitry to the FCOF, generally through the use of small probes. One set of larger probes, such as pogopins, will contact to the fairly large connector on the FCOF sample, and another typically smaller probe set will contact the individual bondpads sets on the flex circuit. Generally, due to the small size of the bondpads, these smaller probe sets use individual cantilever needle-probes, such as those provided by SV Probe, Inc., of Gilbert, Ariz., or other typical semiconductor probe card suppliers. After making electrical contact to the bondpads (input) and connector (output) of the FCOF, testers can measure the signals from the connector to determine whether the FCOF is operational by electrically simulating different head conditions on the bondpads. Testing is generally done by exercising the preamplifier chip through a series of test conditions. A typical test sequence is to simulate a Short condition across the +/− Reader bondpad pair, using the circuitry on the head simulation board, then measure if the preamplifier chip properly detects this Reader Shorted failure by looking at the resulting signals through the connector. Continuing the test sequence, the head simulation circuitry may then electrically float (open) these two Reader bondpad connections and confirm the preamplifier chip detects this Reader Open failure. This sequence may then be repeated for the Writer bondpad pair, and all other device bondpad connections. The head simulation circuit may further apply various typical loads to the bondpads, to simulate different possible Writer, Reader, and other device resistances, and verify that the preamplifier chip detects these normal conditions properly. This overall measurement practice is commonly referred to as Open Faults, Shorted Faults, or No Faults Detection. As an example, if the head simulation circuitry configured an Open condition on one pair of Reader bondpads, but the preamplifier chip responded as either Shorted or Normal condition, then this particular FCOF sample would be separated as having a failure. Various Fault and Resistance measurements are available through the preamplifier chip and are known in the art today.

Overall this system requires precision circuitry for simulating the different head conditions and also a precise means of probing each of the individual bondpads, generally in the form of needle-probes, which are quite small, delicate, and tend to dent, scratch, or otherwise damage the bondpads on the flex circuit. Therefore, it is desirable to make a simplified tester that can still detect these failures in the FCOF, but does not require precision probing or specialized head simulation test circuitry.

It is also desirable to test at the APFA level. Whether or not testing had been done at the FCOF level, the APFA testing will again purge failures that may have occurred before or after FCOF assembly, including any damage caused by mounting of the FCOF onto the HSA Arm. Per above the next step in the manufacturing process is to bond the HGAs to the APFA. The HGAs are a very expensive component of the HSA Assembly, so it is desirable to confirm the APFA and FCOF are functioning properly before the expensive HGAs are installed. Fundamentally, APFA testing is the same testing as FCOF testing, since they are both testing the same FCOF, except that the positioning requirements for probing the FCOF bondpad sets while the FCOF is mounted to the HSA Arm are very difficult. The difficulties are that the HSA Arm partially obstructs these bondpads, making access via cantilever needle-probes difficult, and the position of the FCOF is now more variable due to the mechanical tolerances of the HSA Arm that the FCOF has been mounted to, making tolerances higher and alignment much more difficult. No testers are known to exist today for this more complex application.

SUMMARY

A tester for a testing a Hard Disk Drive (HDD) flex circuit prior to electrical installation of a Head Gimbal Assembly (HGA) includes a shorting block that makes electrical contact to the bondpads on the sample. The shorting block includes one or more electrical contacts that are electrically grounded and have a size and/or configuration to contact the bondpads as well as the surface of the sample around the bondpads to accommodate positioning tolerances of the sample under test, without need for optics, precise probes, or precision stages. The electrical contacts of the shorting block may be, e.g., a matrix of pogopins or a flexible electrically-conductive material. During testing, the bondpads are shorted together and to ground with the shorting block while it is determined whether Short failures are properly detected. While the shorting block is not engaged with the bondpads, it is determined whether open failures are properly detected.

DETAILED DESCRIPTION

Figure 1:
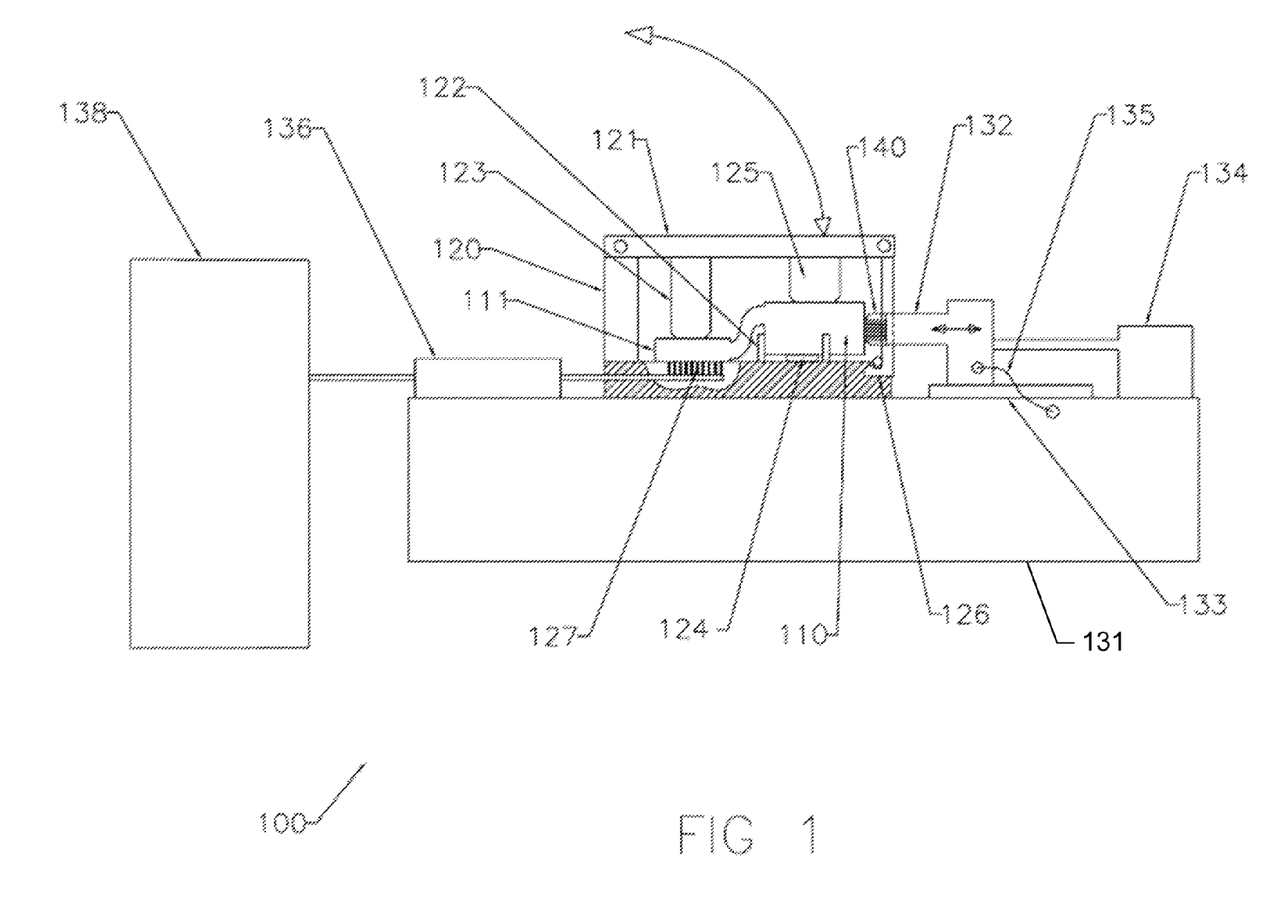
FIG. 1 illustrates a tester that incorporates a shorting block that contacts portions of the FCOF flex circuit that do not contain bondpads.

FIG. 1 illustrates a tester 100 that incorporates a shorting block 140 and a test sample 110 mounted onto tooling 120. The shorting block 140 is mounted to an arm 132, which is then mounted to a stage 133. The stage 133 may be a linear bearing assembly that allows the arm 132 and shorting block 140 to be slid into contact or away from the test sample 110. The bearing assembly is driven by an actuator 134, such as a pneumatic actuator. The arm 132 is electrically conductive and may be electrically coupled to the chassis 131 of the tester 100, e.g., via a wire 135. Other methods of actuation can be used, such as motors or solenoids, hydraulic, or manual, if desired. The shorting block 140 may use force to ensure proper contact with the test sample 110 and, thus, the actuator may be capable of providing a force of e.g., 3 Kg. Alternatively, the shorting block 140 may be in a fixed position and the test sample 110 mounted on the actuation stage 133 (or both the shorting block 140 and the test sample 110 are mounted on actuation stages) to provide respective motion. While this automated engagement is desirable, it is also possible that the shorting block 140 be engaged to the sample 110, e.g., through the use of a clamp, prior to installation of the sample 110 onto tooling 120, negating the need for the actuation stage 133.

The tooling 120 in FIG. 1 is illustrated as holding an APFA test sample 110, but the tooling 120 may be configured to hold test samples such as an FCOF or similar HDD flex circuit subassembly prior to bonding of the one or more HGAs. The APFA tooling 120 utilizes a post 124 to which the test sample 110 is mounted, and a clamp 121 with pusher 125 that holds the test sample 110 onto the post 124. The clamp 121 also has a pusher 123 that presses the connector 111 of the sample 110 against a corresponding connector 127, such as pogopins, contact pads, or a suitable mating connector, on the tooling 120. The clamp 121 also includes a latch 126 that can engage to the base of the tooling 120 to latch the lid in place, thereby clamping the sample 110. The tooling also uses a pin or similar mechanical element 122 that holds the sample 110 in place when the shorting block 140 is engaged. The tooling may have an electrical circuit board 136 that is coupled to the mating connector 127, which will perform the measurements, e.g., in response to signals provided by a processor. The tooling 120 and circuit board 136 may be electrically grounded to the chassis 131 of tester 100.

When the shorting block 140 is engaged against the HGA bondpads (not shown in FIG. 1) of test sample 110 then there is a closed circuit where the bondpads are electrically grounded to the ground of the circuit board 136. The circuit board 136 then tests the sample 110 through conventional means to confirm that the sample properly detects that the bondpads are shorted.

Because the shorting block 140 is mounted to a movable stage it may also be disengaged from the HGA bondpads of sample 110. In this case the circuit board 136 may then test the sample 110 through conventional means to confirm that the sample properly detects that all pads are Open. Of course this open testing may occur before or after the Shorted testing. The Normal testing, which is performed by conventional testers, is not performed through the shorting block 140 with tester 100. As nearly every failure of the test sample 110 is related to Open/Short recognition, the simplification to remove the Normal configuration testing, outweighs the benefits of Normal configuration testing.

A PC or similar processor 138 can be connected to tester 100 in order to sequence the Open/Short testing and to display and record the results. The processor 138 includes a memory storing a computer-usable medium having computer-readable program code embodied therein for causing the processor to control the tester and to perform a desired analysis, as described herein. The data structures and software code for automatically implementing one or more acts described in this detailed description can be implemented by one of ordinary skill in the art in light of the present disclosure and stored on a computer readable storage medium, which may be any device or medium that can store code and/or data for use by a computer system such as processor 138. This includes, but is not limited to, magnetic and optical storage devices such as disk drives, magnetic tape, compact discs, and DVDs (digital versatile discs or digital video discs), and computer instruction signals embodied in a transmission medium (with or without a carrier wave upon which the signals are modulated). The processor 138 may include storage and a display for storing and/or displaying the results of the measurement.

Figure 2A:
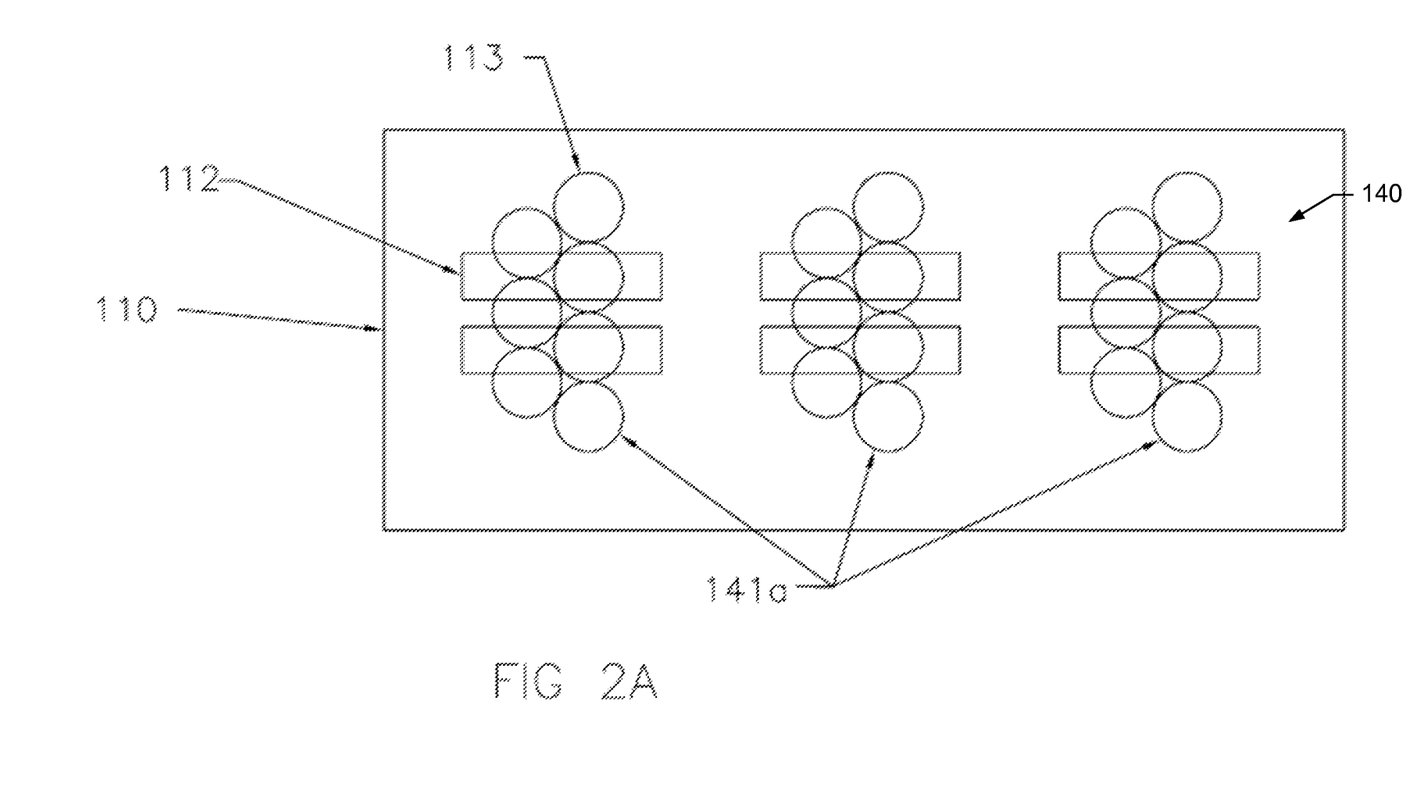
FIG. 2A illustrates a shorting block composed of a matrix of pogopins that match the HGA bondpads contacts on the flex circuit.

FIG. 2A illustrates one embodiment of the shorting block 140 in the form of a matrix of pogopins 141a illustrated in cross section with respect to bondpads 112 on a test sample 110. The test sample 110 may have multiple HGA bondpads 112 on the flex circuit. As an example, a flex circuit with 6 bondpads per HGA and just 1 HGA will have 6 bondpads in total. The layout of the pogopin matrix is designed with a quantity of pogopins sufficient to match these corresponding HGA bondpads 112 on the test sample 110, while also contacting some additional surface of the flex circuit around the bondpads. While variations are possible, one embodiment of the pogopin diameter is roughly 1.5× the smallest dimension of the HGA bondpad 112. In this example the width of each bondpad 112 is 0.007", so a pogopin of diameter 0.010" is used, for example Qualmax PN DBD10CAR-TSK. When installed in a staggered-configuration as shown in FIG. 2A, the pogopins have a center-to-center spacing of 0.005", suitably smaller than the 0.007" minimum dimension of the bondpad 112 it is intended to contact. In this way one or more pogopins will contact the bondpad, to assure electrical contact, while some of the pogopins will also contact areas of the flex circuit that do not contain bondpads.

Because the test sample 110 has multiple bondpads 112, where the bondpad set is 6 bondpads in total, the matrix of pogopins 141a will include enough pogopins to span across the bondpads and with suitable additional tolerance. As shown in sub-matrix 113 there are two pogopins that are not contacting the HGA bondpads at all when the pogopin sub-matrix 113 is positioned to be centered along the centerline of the bondpad set, where one extra pogopin is towards the upper end of sub-matrix 113 and another extra pogopin is towards the lower end. Since the diameter of these pogopins is 0.010", assures electrical contact with these bondpads is assured even if the test sample 110 is vertically displaced by more than +−0.010" vs. pogopin sub-matrix 113. Such a matrix of pogopins 141a allows the convenience of handling variations in assembly tolerances, machining tolerance, and operator installation and alignment, because the pogopins will still make contact even if there is a large variation in positioning from sample to sample. If further contact variation tolerance is desired then additional pogopins can be added to the rows and columns of the sub-matrix 113.

In conventional probing and flex testing, each bondpad must be electrically coupled to its own independent signal. Therefore, in a conventional tester, each individual bondpad must be precisely probed, and the probe cannot be allowed to electrically short-out an adjacent probe. Similarly, the probe cannot be allowed to bridge the bondpads and short them together. As a result, to make each probe and bondpad set electrically isolated each probe must be precisely placed with respect to the target bondpad, and the probe must be small in size. This is complicated by the fact that the size of bondpads tends is to decrease as technology progresses towards smaller form factors and the quantity of bondpads increases.

In tester 100, electrical isolation of each individual bondpad 112 is not required; in fact, shorting of the bondpads together is used. As a result each of the pogopins 141a may contact each other and the pogopins 141a may bridge bondpads. Accordingly, the size requirements of the pogopins are simplified considerably, allowing for usage of larger and more durable pogopins as opposed to needle-probes. Moreover, the tip diameter of each pogopin may be relatively large (ex. 0.010"), as opposed to the typical tip diameter of needle-probes (ex. 0.001"), which will reduce the impact of denting on the bondpads 112. After testing, the HGAs will be bonded to the bondpads 112 on the sample, and thus, damage to the bondpads during testing is undesirable.

Figure 2B:
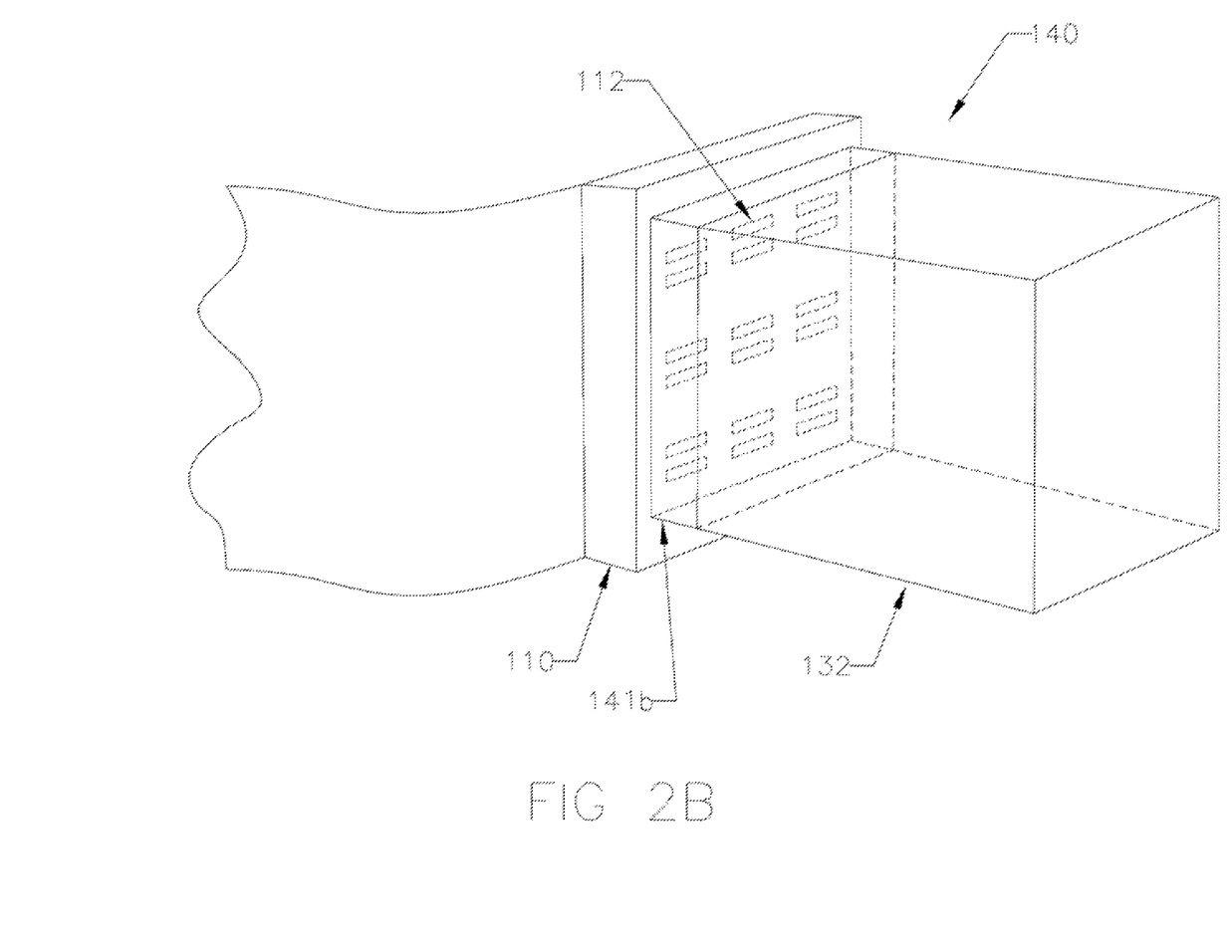
FIG. 2B illustrates a shorting block composed of a flexible material with low contact resistance.

FIG. 2B illustrates another embodiment of the shorting block 140 that uses a flexible electrically-conductive material 141b. One possibility is to use material cho-seal #1501 from Parker-Chomerics. Similar to the matrix of pogopins 141a, the flexible electrically-conductive material 141b is cut or otherwise manufactured into a layout that matches the size and configuration of the HGA bondpads 112, and flexible electrically-conductive material 141b is mounted to the arm 132. The flexible electrically-conductive material 141b should be cut to size that is adequate for contacting the target bondpads 112 but large enough to also contact some additional surface of the flex circuit around the bondpads 112.

The shorting block 140 is electrically grounded, e.g., via the arm 132. By way of example, if pogopins 141a are used within the shorting block 140, then the side of the pogopins 141a facing the arm 132 are installed to mechanically contact with the arm 132, shorting the pogopins 141 and the arm 132 together and to the measurement ground (as an example through the chassis 131 as shown in FIG. 1) to electrically couple the shorting block 140 to the measurement ground during testing.

Thus, the shorting block 140 includes one or more electrical contacts, e.g., pogopins 141a and/or flexible electrically-conductive material 141b (collectively referred to herein as electrical contacts 141) that are electrically grounded and have a size and/or configuration that is sufficient to contact at least one bondpad 112 on the sample while also contacting some surface of the sample that does not include a bondpad 112 so that contact with the bondpad is assured.

The tester 100 includes a shorting block 140 that is configured to short the bondpads 112 on the sample 110 by physically contacting the bondpads 112, and placing the bondpads 112 in an open condition by removing the physical contact with the bondpads 112. Thus, the tester 100 tests for an open condition when there is no physical contact between the one or more electrical contacts 141 of the shorting block 140 and the bondpads 112 on the sample 110 and tests for a Short condition when the one or more electrical contacts 141 of the shorting block 140 contact the bondpads 112 on the sample 110. MOVE?

Figure 3:
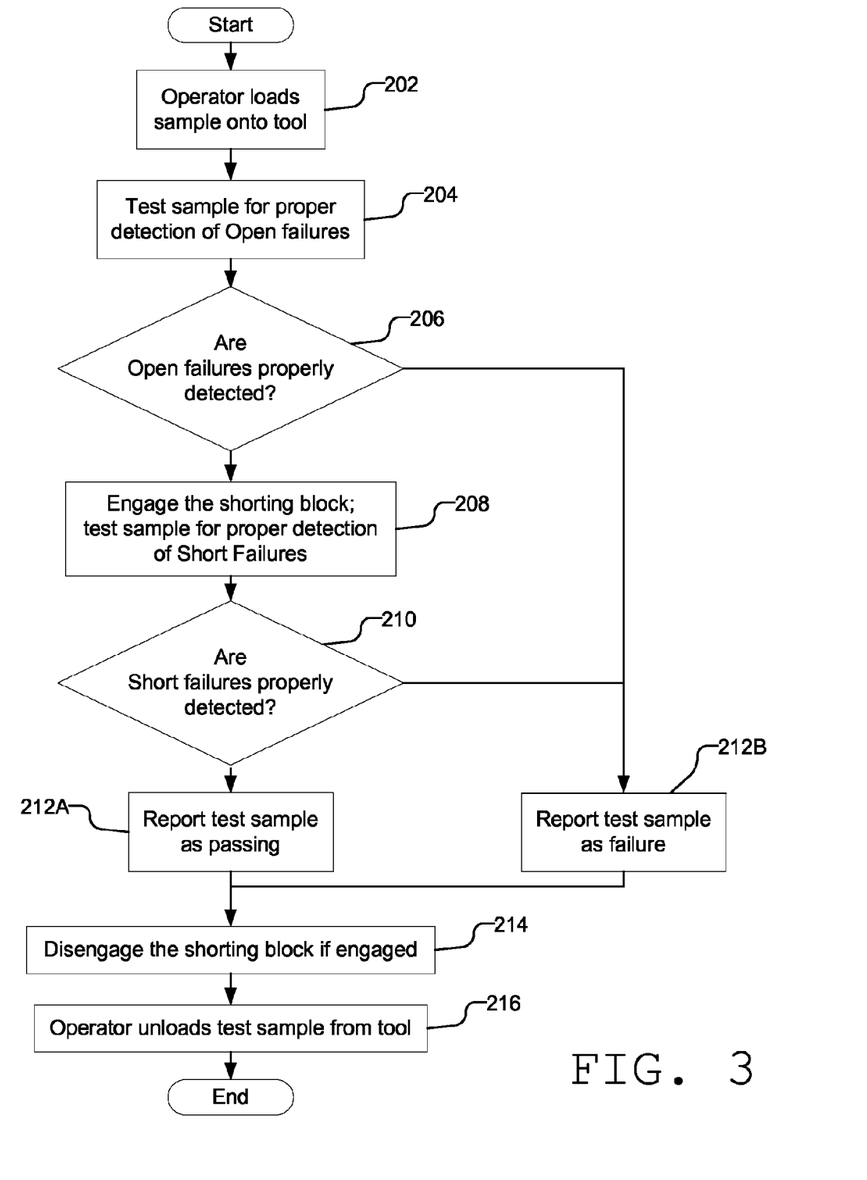
FIG. 3 shows a flowchart of a typical test sequence whereby a sequence of Open and Short failure detection is achieved

FIG. 3 is a flowchart 200 illustrating a typical test sequence with tester 100. The operator loads the test sample 110 onto tooling 120 of tester 100 and starts the test (202). Through the circuit board 136, the tester 100 exercises the preamplifier chip within sample 110 to detect that the sample properly recognizes all Open conditions (204). If Open conditions are not properly detected (206), the sample will be reported as a Failure (212B). If Open conditions are properly detected (206), the tester engages the actuator 134, bringing the shorting block 140 into contact with the HGA bondpads 112 of test sample 110, and through circuit board 136 the tester exercises the preamplifier chip within sample 110 to detect if the sample properly recognizes all Shorted conditions (208). If Shorted conditions are not properly detected (210), the sample will be reported as a Failure (212B). If Shorted conditions are properly detected (210), the tester reports the sample as Pass (212A). The tester disengages the shorting block (214) and the operator can remove the sample (216).

Note that the sequence described is typical but other variations may apply. For example the Shorting test may occur before the Open test, and the failure reporting may be reported at the end to allow both Open and Short testing to occur even if the first test produces a failure. The results can then be recorded and displayed by processor 138.

Figure 4A:
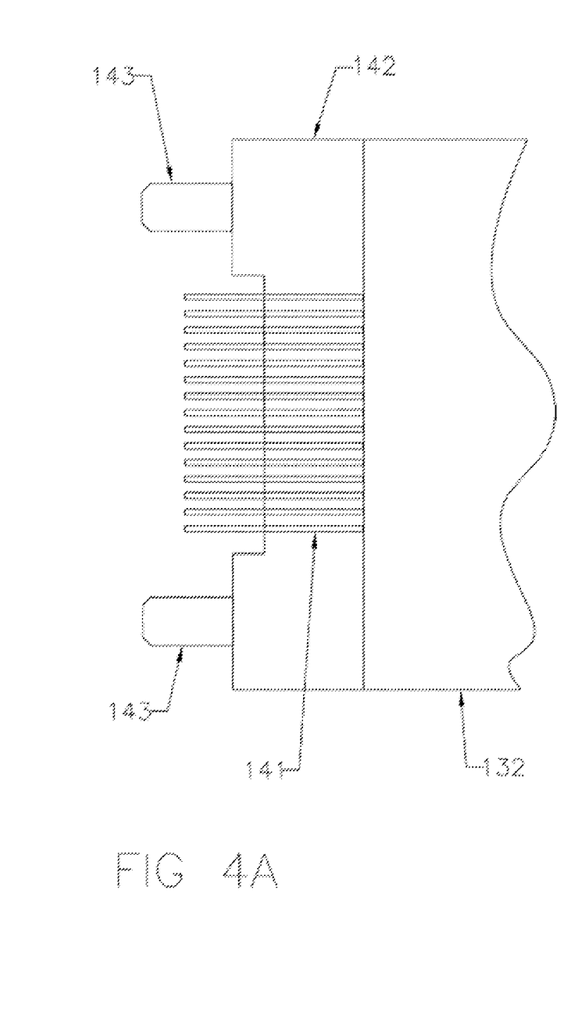
FIG. 4A and FIG. 4B illustrate a means of alignment of the shorting block to the test sample and show a means for a compliant contact.
Figure 4B:
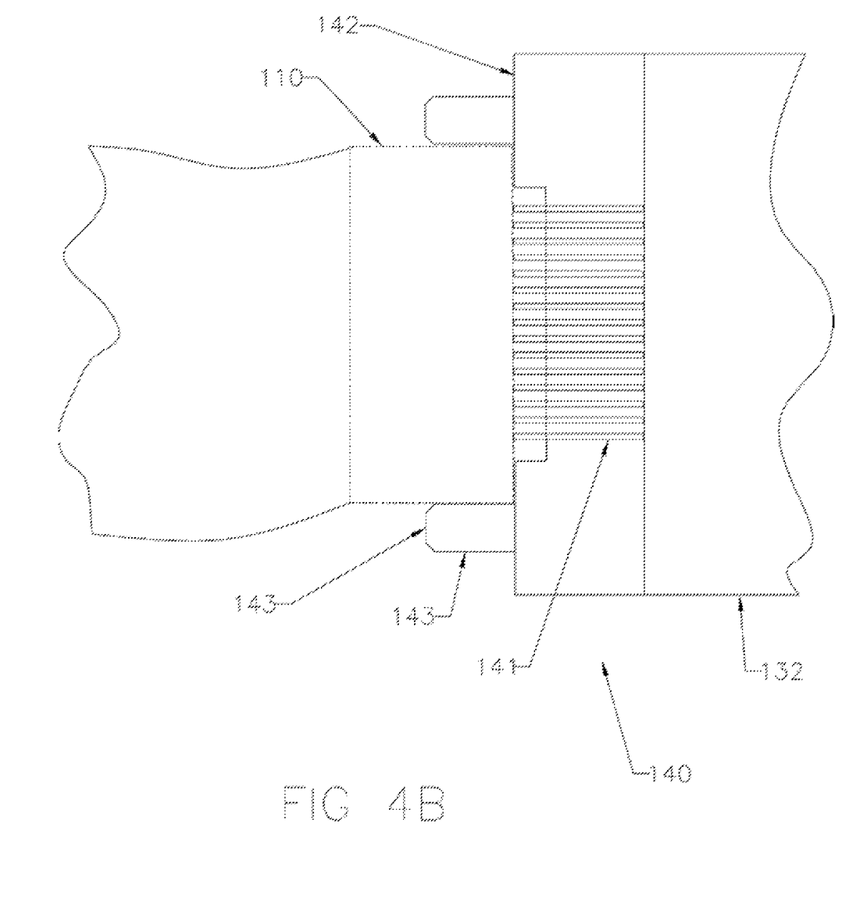

FIG. 4A shows a perspective view of a test sample 110 with 18 bondpads 112 and a side view of a shorting block 140 prior to engagement with the bondpads 112, where the shorting block (in this case composed of pogopins 141a) are in free state. FIG. 4B shows a side view of the test sample 110 engaged against the shorting block 140 such that the pogopins 141a are compressed. Also shown in FIGS. 4A and 4B is the mechanical compliance element 142 that contacts the test sample 110 once the desired compressions is achieved. Further shown is an alignment element 143 that may be used for alignment purposes and removed or left in place during normal testing, as desired. FIGS. 4A and 4B collectively will be referred to as FIG. 4.

FIG. 4 illustrates a means for aligning the shorting block 140 to the HGA bondpads 112 of test sample 110. While only coarse alignment is required it may be desirable to allow the user to easily align the shorting block 140 to a typical test sample. This may be helpful if the user needs to replace the shorting block 140 for cleaning or repair, or to exchange the shorting block 140 with a different configuration for a test sample 110 of a different design. One means for aligning is the alignment element 143, which may be a two pins or similar mechanical pieces, that may be temporarily installed onto the shorting block 140. The alignment element 143 is designed to fit over and under, or otherwise register, against the test sample 110. The shorting block 140 may be mounted to the arm 132 via loose screws, and then the shorting block is engaged to the test sample. Once engaged, the alignment element 143 guides the shorting block 140 into alignment against the test sample 110, at which time the loose screws fixing the shorting block 140 against the arm 132 may be tightened. The alignment element 143 may be removable or may remain on the shorting block 140 throughout normal testing for automatic alignment with the test sample 110 during actuation.

Also, as shown in FIG. 4, the shorting block 140 and arm 132 may also have a compliance means that limits the contact force against the test sample 110 and also allow for variability in positioning tolerance of various test samples. This compliance means could be in the form of a mechanical compliance element 142 that mounts to the arm 132 and contacts the test sample 110 once the desired compression of the shorting block 140 is achieved. The mechanical compliance element 142 may be a portion of the alignment element 143 if desired. Alternatively, the compliance means could also be in the form of a controller on the actuator 134, such as controlled air pressure or motor force. Alternatively, the compliance means could be a spring assembly installed between the actuator 134 and the shorting block 140. In general, the advantage of using a compliance means is that the actuator 134 can automatically engage the shorting block 140 against the sample 110 with the desired contact force.

FIG. 5 illustrates an example of a typical APFA 180, which may be used as the test sample 110 with tester 100, and set of three HGAs 186 prior to electrical bonding and mechanical swaging to the APFA 180, as known in the art today. Also shown are bondpads 112, in this example, eighteen in total, connector 111, and preamplifier chip 114, which are all part of the APFA. While FIG. 5 illustrates an APFA 180, which may be used as the test sample 110, the test sample 110 may be an FCOF sample or any HDD flex circuit test sample prior to bonding the HGAs 186, which may all be tested in a similar manner. Other possible examples of the test sample that may be used with tester 100 include the Actuator Flex Assembly (AFA), which is similar to APFA except the pivot bearing is not yet installed, or any number of other variations of flex circuit testing prior to the bonding of HGAs 186. For such various sample testing it may be preferable to rearrange the tester 100 such that the test sample 110 is mounted with the bondpads 112 facing up or down, such that the shorting block 140 would be engaged vertically, as opposed to the horizontal actuation shown in FIG. 1.

It should also be noted that the shorting block 140 may be designed to contact any one or more bondpads 112 on the test sample. If a test sample is equipped with multiple bondpads, then the shorting block 140 may contact any one or more of these individual HGA bondpads, as long as the shorting block is sufficiently large enough to also contact a surface on the sample that does not include a bondpad.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An apparatus for testing a sample, the apparatus comprising:
   a clamp that holds the sample, the sample comprising a Hard Disk Drive (HDD) flex circuit prior to electrical installation of a Head Gimbal Assembly (HGA), the sample having at least one bondpad and an electrical connector;
   an electrical interface to connect to the electrical connector of the sample;
   a shorting block that includes one or more electrical contacts that are electrically grounded and have at least one of a size and configuration to contact the at least one bondpad on the sample while also contacting a surface of the sample that does not include the at least one bondpad, wherein the at least one bondpad comprises a plurality of bondpads on the sample and when the shorting block contacts the plurality of bondpads the shorting block shorts the plurality of bondpads together and grounds the plurality of bondpads; and
   a measurement circuit coupled to receive signals from the electrical interface to measure an electrical response of the sample while the shorting block is engaged against the at least one bondpad.

2. The apparatus of claim 1, wherein the shorting block comprises at least one of a matrix of pogopins and a flexible electrically-conductive material.

3. The apparatus of claim 1, wherein the shorting block is electrically grounded to the measurement circuit.

4. The apparatus of claim 1, wherein the measurement circuit is configured to measure an electrical response for at least one of Write Fault and Read Fault.

5. The apparatus of claim 1, further comprising a processor with memory coupled to the measurement circuit, memory coupled to the processor, and software held in memory and run in the processor to cause the processor to analyze the measured electrical response to determine that the sample is passing or failing.

6. The apparatus of claim 1, further comprising an actuator that provides relative movement between the shorting block and the sample to engage the shorting block against the at least one bondpad on the sample to electrically ground the at least one bondpad.

7. The apparatus of claim 6, wherein the actuator comprises at least one of a pneumatic actuator, motorized actuator, hydraulic actuator, or manual actuator.

8. The apparatus of claim 6, wherein the actuator moves at least one of the sample and the shorting block.

9. The apparatus of claim 1, wherein the measurement circuit can measure the sample when the shorting block is disengaged from the at least one bondpad.

10. The apparatus of claim 1, further comprising a clamp to hold the shorting block in place against the sample.

11. The apparatus of claim 1, further comprising a mechanical element to hold the sample stationary while the shorting block is engaged against the at least one bondpad.

12. The apparatus of claim 1, wherein the electrical interface comprises at least one of a mating connector, contact pads, and pogopins.

13. The apparatus of claim 1, wherein the shorting block has an alignment element to align the shorting block against the sample.

14. The apparatus of claim 13, further comprising an arm coupled to the shorting block, wherein the alignment element is used to align the shorting block against the sample while mounting the shorting block to the arm.

15. A method comprising:
loading a sample onto a tester, the sample comprising a Hard Disk Drive (HDD) flex circuit prior to electrical installation of a Head Gimbal Assembly (HGA), the sample having at least one bondpad and an electrical connector, wherein loading comprises connecting an electrical interface to the electrical connector of the sample;

engaging a shorting block with the at least one bondpad, engaging the shorting block comprises contacting one or more electrical contacts on the shorting block with the at least one bondpad on the sample and a surface of the sample that does not include the at least one bondpad and grounding the at least one bondpad, wherein the at least one bondpad comprises a plurality of bondpads on the sample and engaging the shorting block comprises shorting the plurality of bondpads together and grounding the plurality of bondpads; and measuring an electrical response from the sample while the shorting block is engaged with the at least one bondpad;

determining if Short failures are properly detected; and reporting if Short failures are properly detected.

16. The method of claim 15, further comprising:
measuring an electrical response from the sample while the shorting block is not engaged with the at least one bondpad;

determining if Open failures are properly detected; and reporting if Open failures are properly detected.

17. The method of claim 16, wherein determining if Open failures are properly detected is performed prior to determining if Short failures are properly detected.

18. The method of claim 15, wherein the shorting block comprises at least one of a matrix of pogopins and a flexible electrically-conductive material.

19. The method of claim 15, wherein engaging the shorting block comprises moving at least one of the shorting block and the sample to produce contact between the one or more electrical contacts on the shorting block and the at least one bondpad.

* * * * *